United States Patent
Sharma et al.

(10) Patent No.: US 10,596,551 B2
(45) Date of Patent: Mar. 24, 2020

(54) REFORMING CATALYST AND A METHOD OF PREPARATION THEREOF

(71) Applicant: Reliance Industries Limited, Mumbai (IN)

(72) Inventors: Nagesh Sharma, Vadodara (IN); Ajay Kumar, Vadodara (IN); Veera Venkata Satya Bhaskara Sita Rama Murthy Katravulapalli, Hyderabad (IN); Anilkumar Mettu, Narasaraopet (IN); Kalpana Gopalakrishnan, Vadodara (IN); Raksh Vir Jasra, Vadodara (IN)

(73) Assignee: Reliance Industries Limited, Mumbai (IN)

( * ) Notice: Subject to any disclaimer, the term of this patent is extended or adjusted under 35 U.S.C. 154(b) by 189 days.

(21) Appl. No.: 15/507,679

(22) PCT Filed: Aug. 26, 2015

(86) PCT No.: PCT/IB2015/056465
§ 371 (c)(1),
(2) Date: Feb. 28, 2017

(87) PCT Pub. No.: WO2016/030834
PCT Pub. Date: Mar. 3, 2016

(65) Prior Publication Data
US 2017/0239645 A1    Aug. 24, 2017

(30) Foreign Application Priority Data

Aug. 29, 2014    (IN) .................... 2770/MUM/2014

(51) Int. Cl.
| | | |
|---|---|---|
| B01J 23/648 | (2006.01) | |
| B01J 37/03 | (2006.01) | |
| B01J 37/04 | (2006.01) | |
| B01J 37/10 | (2006.01) | |
| B01J 37/02 | (2006.01) | |
| C10G 35/09 | (2006.01) | |
| C10G 35/06 | (2006.01) | |
| B01J 21/04 | (2006.01) | |
| B01J 23/20 | (2006.01) | |
| B01J 23/62 | (2006.01) | |
| B01J 35/00 | (2006.01) | |
| B01J 37/00 | (2006.01) | |
| B01J 37/08 | (2006.01) | |
| B01J 27/135 | (2006.01) | |
| B01J 35/02 | (2006.01) | |
| B01J 37/24 | (2006.01) | |
| B01J 27/13 | (2006.01) | |

(52) U.S. Cl.
CPC ............ *B01J 23/648* (2013.01); *B01J 21/04* (2013.01); *B01J 23/20* (2013.01); *B01J 23/626* (2013.01); *B01J 23/6484* (2013.01); *B01J 23/6486* (2013.01); *B01J 35/0006* (2013.01); *B01J 37/009* (2013.01); *B01J 37/0205* (2013.01); *B01J 37/0207* (2013.01); *B01J 37/0213* (2013.01); *B01J 37/0236* (2013.01); *B01J 37/036* (2013.01); *B01J 37/04* (2013.01); *B01J 37/08* (2013.01); *B01J 37/088* (2013.01); *B01J 37/10* (2013.01); *C10G 35/06* (2013.01); *C10G 35/09* (2013.01); *B01J 27/13* (2013.01); *B01J 27/135* (2013.01); *B01J 35/023* (2013.01); *B01J 37/24* (2013.01); *B01J 2523/00* (2013.01)

(58) Field of Classification Search
CPC ...... B01J 23/622; B01J 23/624; B01J 23/626; B01J 23/648; B01J 23/6484; B01J 23/6486
See application file for complete search history.

(56) References Cited

U.S. PATENT DOCUMENTS

| | | | |
|---|---|---|---|
| 2,922,767 A | 1/1960 | Koch et al. | |
| 3,312,634 A | 4/1967 | Bernas et al. | |
| 4,748,145 A * | 5/1988 | Wood .................. | B01J 23/40 502/242 |
| 5,668,074 A * | 9/1997 | Wu ...................... | B01J 23/648 502/325 |
| 6,191,064 B1 | 2/2001 | Wu et al. | |
| 2005/0221977 A1 | 10/2005 | Fukunaga et al. | |
| 2006/0135809 A1* | 6/2006 | Kimmich .............. | B01J 23/44 560/241 |
| 2010/0125037 A1* | 5/2010 | Negiz .................. | B01J 23/48 502/331 |

(Continued)

FOREIGN PATENT DOCUMENTS

JP    2003-144924    *    5/2003    ............ B01J 23/648

OTHER PUBLICATIONS

English machine translation of JP 2003-144924, obtained from J-PlatPat Mar. 11, 2019. (Year: 2003).*

(Continued)

*Primary Examiner* — Renee Robinson
(74) *Attorney, Agent, or Firm* — Osha Liang LLP (57) ABSTRACT

The present disclosure relates to a reforming catalyst composition comprising a spherical gamma $Al_2O_3$ support; at least one Group VB metal oxide sheet coated on to the $Al_2O_3$ support; and at least one active metal and at least one promoter metal impregnated on the $Al_2O_3$ coated support. The reforming catalyst composition of the present disclosure has improved activity, better selectivity for total aromatics during naphtha reforming and results in less coke formation. The reforming catalyst composition has improved catalyst performance with simultaneous modification of acidic sites as well as metallic sites through metal support interaction. The acid site cracking activity of the catalyst is inhibited because of the use of chloride free alumina support modified with solid acid such as Group VB metal oxide and impregnated with active metals. The present disclosure provides a process for naphtha reforming in the presence of the reforming catalyst composition of the present disclosure to obtain reformates of naphtha.

7 Claims, 5 Drawing Sheets

(56) References Cited

U.S. PATENT DOCUMENTS

2010/0187159 A1* 7/2010 Naunheimer ............ B01J 8/125
208/141
2014/0066663 A1* 3/2014 Dakka .................... B01J 23/626
568/799

OTHER PUBLICATIONS

International Search Report issued in PCT/1132015/056465 dated Dec. 16, 2015 (2 pages).
Written Opinion of the International Searching Authority issued in PCT/IB2015/056465 dated Dec. 16, 2015 (6 pages).

* cited by examiner

REFORMING CATALYST AND A METHOD OF PREPARATION THEREOF

FIELD

The present disclosure relates to a reforming catalyst composition and a method for preparation thereof.

BACKGROUND

Catalytic reforming is a well-established industrial process in the refining industry for improving the octane quality of naphtha and in petrochemical industry for the production of aromatics. In catalytic reforming, a bi-functional catalyst (having metal function and acidic function) is employed, which governs reactions such as dehydrogenation and hydrogenation of naphthenes. The conventional catalyst used for catalytic naphtha reforming process is platinum (Pt) alone or in combination with rhenium (Re), iridium (Ir), tin (Sn) or germanium (Ge) promoted on a gamma alumina support. The gamma alumina support usually contains chloride to provide the acid function to the catalyst which governs reactions, such as dehydrocyclization, hydrocracking, isomerization, and the like.

However, the catalyst gets deactivated during the aforestated reactions, mainly due to coking. As the coke builds up on the catalyst surface, the reaction temperature has to be increased gradually to offset the loss of catalyst activity. Over a period of time it becomes economically infeasible to continue the operations and thus, the catalyst requires to be regenerated. Based on the frequency of regeneration of the catalyst, processes are broadly classified as (1) Semi-regenerative or (2) Continuous Catalytic Regenerative (CCR) type.

Fixed-bed reactors are usually employed in semi-regenerative process. In the semi-regenerative process, the reformer unit is taken off the stream and the total catalyst in the unit is regenerated. The activity levels of a regenerated catalyst is close to that of a fresh catalyst obtained at the start of a' successive cycle of operation. Commercially, the preferred catalyst used in semi-regenerative unit is Pt—Re/$Al_2O_3$ which is found to be stable.

In a continuous reforming process, moving-bed reactors are used, where the catalyst is moved continuously through the reactors and is withdrawn from the last reactor for regeneration in a regeneration section and returned to the first reactor as virgin catalyst. Thus, there is no production loss due to down time and catalyst deactivation. The CCR reformer can be operated continuously under severe conditions. The other major advantages of this operation are high catalyst activity and selectivity. The catalyst formulation Pt—Sn/$Al_2O_3$ offers high selectivity at low pressure and thus is a good choice in continuous reforming units. The other advantages of Pt—Sn/$Al_2O_3$ include increased activity and selectivity to aromatic formation through higher paraffin dehydrocyclization, decreased rate of deactivation compared to platinum-only catalysts, ability to attain a high degree of platinum dispersion, and resistance to agglomeration.

In a reforming catalyst a certain level of catalyst acidity is required to initiate essential isomerization reactions; however, the presence of increased acidity due to chlorination, leads to yield loss and catalyst deactivation. A requirement in catalytic reforming is to improve selectivity to liquid products and yield of aromatics by reducing the formation of light $C_1$-$C_4$ gaseous products which are produced by acid cracking reactions.

Although, commercially successful catalysts have been developed, there still exists a need for further improvement, especially with regard to catalyst activity, selectivity and stable performance. Also, there is a need for improving the reformate yield and simultaneous suppression of acid site cracking.

Objects

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide a reforming catalyst composition having improved catalytic activity and selectivity.

Another object of the present disclosure is to provide a stable reforming catalyst composition with respect to $C_8$ and total aromatics yield.

Still another object of the present disclosure is to provide a process for the preparation of reforming catalyst composition.

Yet another object of the present disclosure is to provide a reforming catalyst composition with optimized acidic sites.

Other objects and advantages of the present disclosure will be more apparent from the following description, which is not intended to limit the scope of the present disclosure.

SUMMARY

In accordance with one aspect of the present disclosure there is provided a reforming catalyst composition comprising a spherical gamma $Al_2O_3$ support; at least one Group VB metal oxide sheet coated on to the $Al_2O_3$ support; and at least one active metal and at least one promoter metal impregnated on the $Al_2O_3$ coated support.

In accordance with another aspect of the present disclosure there is provided a method for preparing a reforming catalyst composition, the method comprising the following steps: dissolving at least one Group VB metal chloride in a predetermined amount of alcohol and aqueous ammonia to obtain Group VB metal oxide gel. A predetermined amount of $Al_2O_3$ is added to the Group VB metal oxide gel to obtain a first mixture. The first mixture is hydrothermally treated at a temperature in the range of 160° C. to 200° C. for time period ranging from 40 hours to 50 hours to obtain a second mixture comprising a modified $Al_2O_3$ support. The second mixture is filtered to obtain first residue. The first residue is dried at a temperature in the range of 100 to 150° C. for a time period ranging from 10 to 15 hours to obtain dried modified alumina support. The dried modified $Al_2O_3$ support is calcined at a temperature in the range of 530° C. to 560° C. for a time period ranging from 4 to 8 hours to obtain a calcined modified alumina support. Further, a predetermined amount of at least one active metal and at least one promoter metal are dissolved in water to obtain a third mixture. The third mixture is treated with concentrated HCl to obtain dark red colored fourth mixture. The so obtained calcined modified $Al_2O_3$ support is introduced into the fourth mixture and stirred for a time period ranging from 8 to 16 hours at a temperature in the range of 25° C. to 35° C. from which, water is removed under reduced pressure to obtain a second residue. The second residue is dried and calcined to obtain a reforming catalyst composition.

The present disclosure provides a process for naphtha reforming in the presence of the reforming catalyst composition of the present disclosure to obtain reformates of naphtha.

BRIEF DESCRIPTION OF THE ACCOMPANYING DRAWINGS

The results of experiments with reforming catalyst of this disclosure in comparison to a reference catalyst will now be described with reference to the following non limiting figures, in which.

DETAILED DESCRIPTION

The disclosure will now be described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Catalytic naphtha reforming is an important industrial process which is used to enhance valuable aromatics such as benzene, toluene and xylene (BTX) in the reformate. During the reforming of naphtha, mainly straight chain alkanes, having 6 to 10 carbon atoms, are reformed into molecules with the same number of carbon atoms but different structures. The naphtha feedstock used for catalytic reforming contains naphthenic hydrocarbons, paraffinic hydrocarbons and aromatic hydrocarbons of different carbon numbers.

Catalytic naphtha reforming usually includes a number of different reactions that take place in the vapor phase over a suitable catalyst under a high partial pressure of hydrogen. Important reforming reactions include: dehydrogenation of naphthenes to produce aromatics, isomerization of linear paraffins to form branched paraffins or iso-paraffins, and dehydrocyclization of paraffins to form aromatics and hydrocracking. Each reaction can be favored by different reaction conditions and can take place at different catalytic active sites. Some of these reactions, such as dehydrogenation, are catalyzed by metal sites, whereas others, such as isomerization and dehydrocyclization, take place mostly via a bi-functional mechanism, in that they require both metal and acid catalytic sites. The dehydrogenation of naphthenes and dehydrocyclization of paraffins are the major reactions in reforming, which are endothermic in nature, while other reactions such as hydrocracking and hydrogenolysis are exothermic in nature. The catalysts used for reforming process are usually bi-functional in nature (i.e. having metal function and the acidic function). In a typical reforming process, naphtha is processed over acidic catalysts, supported on chlorinated $Al_2O_3$ which may also contain one or more dehydrogenation metals, i.e., noble metals with stabilizing metal ions. In a reforming catalyst a certain level of catalyst acidity is required to initiate essential isomerization reactions; however, presence of increased acidity leads to yield loss and catalyst deactivation.

Therefore, the inventors of the present disclosure envisage a catalyst composition wherein chlorination of the alumina support is avoided.

In accordance with one aspect of the present disclosure there is provided a catalyst composition for reforming reactions. The catalyst composition comprises:
  a. a spherical gamma $Al_2O_3$ support;
  b. at least one Group VB metal oxide sheet coated on to the $Al_2O_3$ support; and
  c. at least one active metal and at least one promoter metal impregnated on the $Al_2O_3$ coated support.

The metals impregnated on alumina act as active agents and promoters. The support modified by the Group VB metal oxide sheet and the catalyst prepared therefrom can be used for the semi-regenerative as well as the CCR reforming process for extending catalyst life.

In accordance with the present disclosure, the Group VB metal is at least one selected from the group consisting of niobium (Nb) and tantalum (Ta).

In accordance with the present disclosure, the active metal is at least one metal selected from Group VIII metals including, but not limited to, platinum (Pt) and palladium (Pd).

In accordance with the present disclosure, the promoter metal is at least one metal selected from Group IVA, VIIB and VIIIB, includes, but not limited to, tin (Sn), germanium (Ge), rhenium (Re) and iridium (Ir).

The reforming catalyst composition in accordance with the present disclosure has improved activity, better selectivity for total aromatics during naphtha reforming and results in less coke formation. The reforming catalyst composition has improved catalyst performance with simultaneous modification of acidic sites as well as metallic sites through metal support interaction. The acid site cracking activity of the catalyst is inhibited because of the use of chloride free alumina support modified with solid acid such as Group VB metal oxide and impregnated with active metals.

In accordance with another aspect of the present disclosure, there is provided a method for the preparation of the catalyst composition, the method comprises the following steps:

Group VB metal oxide gel is prepared by dissolving Group VB metal chloride in a predetermined amount of alcohol and aqueous ammonia solution in a flask;

a predetermined amount of $Al_2O_3$ is added to the flask containing Group VB metal oxide gel to obtain a first mixture;

the first mixture is hydrothermally treated at a predetermined temperature for a predetermined time period to obtain a second mixture comprising modified $Al_2O_3$ coated with Group VB metal oxide sheet;

the second mixture comprising modified $Al_2O_3$ is filtered to obtain a first residue and filtrate;

the first residue is dried and calcined to obtain a calcined modified $Al_2O_3$.

in a second flask a predetermined amount of Group VIII metal salt and a predetermined amount of at least one salt selected from Group IVA, VIIB and VIIIB are dissolved in water to obtain a third mixture;

predetermined amount of concentrated HCl is added to the third mixture to obtain a dark red in colored fourth mixture;

predetermined amount of the calcined modified $Al_2O_3$ is added to the fourth mixture and the same is stirred for a time period in the range of 8 to 16 hours at a temperature in the range of 25 to 35° C. to obtain a slurry;

water is removed from the slurry under reduced pressure on rotary evaporator to obtain the second residue; and the second residue is dried and calcined to obtain the catalyst composition.

The thickness of the metal oxide sheet is one of the parameters that controls the activity of the catalyst and selectivity for the reaction products; and an optimum thickness is required to enhance the stability and performance of the catalyst composition. In an embodiment of the present disclosure the metal oxide sheet has a thickness ranging from 100 to 250 μm.

The concentration of the Group VB metals ranges from 0.01 to 0.5 wt % of the catalyst.

The Group VB metal oxide sheet is coated on the spherical $Al_2O_3$ support by hydrothermal crystallization method.

The predetermined temperature is in the range of 160 to 200° C.

The first predetermined time period may range between 40 to 50 hours.

So obtained modified support is dried at a temperature in the range of 100 to 150° C. for a time period ranging from 10 to 15 hours and then calcined at a temperature in the range of 530 to 560° C. for a time period ranging from 4 to 8 hours to obtain the calcined modified support.

The modified alumina support may be impregnated with metals of Group VIII include, but not limited to, platinum (Pt) and palladium (Pd), which are used as active metal.

Group IVA, VIIB and VIIIB metals includes, but limited to, tin (Sn), germanium (Ge), rhenium (Re) and iridium (Ir) are used as promoter.

The impregnation of active metals and promoter metals on the modified alumina support may be carried out by selecting at least one method from the group comprising equilibrium method, pore volume method and incipient wetness method.

The concentration of the active agent and the promoter metal may range from 0.01 to 0.5 wt % of the catalyst.

In an exemplary embodiment of the present disclosure, equilibrium rota vapor impregnation method is used to impregnate the active metal and the promoter metal on the modified alumina support.

In an embodiment of the present disclosure, a solution of chloride salt of active metal and promoter metal is prepared as a precursor.

In accordance with one embodiment of the present disclosure, the Group VIII metal salt is $H_2PtCl_6.(H_2O)_6$.

In accordance with one embodiment of the present disclosure, Group IVA metal salt is $SnCl_2$.

In an embodiment of the present disclosure, pre-determined quantities of $H_2PtCl_6.(H_2O)_6$ and $SnCl_2$ are added to prepare a reaction mixture.

Concentrated Hydrochloric acid (HCl) is added to the reaction mixture to avoid precipitation of the metal chloride and form a dark red colored solution.

The modified alumina support is added to the dark red colored solution and kept immersed at a temperature ranging from 25 to 35° C. for a time period ranging from 8 to 16 hours, with intermediate stirring. During this step, the alumina support gets impregnated with metal typically in the range of 1:5 to 1:7 (by wt).

The catalyst so obtained is dried at a temperature ranging from 100 to 150° C. for a time period ranging from 10 to 15 hours and then calcined at a temperature in the range of 530 to 560° C. for a time period in the range of 4 to 8 hours to obtain the reforming catalyst composition of the disclosure. The residual chloride in the catalyst composition is optimized so that it provides sufficient acidic sites without negatively affecting the yield.

In accordance with still another aspect of the present disclosure, there is provided a process for naphtha reforming in the presence of the reforming catalyst composition of the present disclosure.

Initially, a reactor is charged with a predetermined amount of the reforming catalyst composition. The reactor is flushed with nitrogen to maintain the inert atmosphere. $H_2$ is introduced in the reactor till a pressure of 7.3 kg/cm$^2$ is attained. The catalyst is further heated at a temperature in the range of 440 to 540° C. After heating the catalyst composition, naphtha having LHSV of 1.95 hour$^{-1}$ is contacted with the reforming catalyst composition to obtain reformates of naphtha.

In the conventional catalyst (where alumina is first chlorinated followed by impregnation of the active metals for the preparation of the catalyst), the catalyst requires the addition of certain amount of chloride after each cycle of regeneration. In the present disclosure the chloride free alumina is used as the catalyst support for the preparation of the catalyst composition, and does not require additional chloride dosing even after regeneration for maintaining the activity and stability of the catalyst.

The reforming catalyst composition prepared in accordance with the present disclosure results in improved reformate yield and suppresses acid site cracking due to optimized alumina sites. As a consequence of the decreased cracking; the catalyst activity and selectivity towards aromatization is improved. Also, the coke content formed on the spent catalyst surface is lower when compared with conventional catalyst composition.

The present disclosure is further described in light of the experiments provided herein below which are set forth for illustration purpose only and not to be construed for limiting the scope of the disclosure. These laboratory scale experiments can be scaled up to industrial/commercial scale.

Experiment 1: Preparation of a Reforming Catalyst

A flask was charged with 1 g of niobium chloride and 60 mL of alcohol+aqueous ammonia solution to obtain niobium oxide gel. 30 g of $Al_2O_3$ was added to the flask containing niobium oxide gel to obtain a first mixture. The first mixture was hydrothermally treated at 180° C. for 48 hours to obtain a second mixture comprising a modified $Al_2O_3$. The second mixture was filtered to obtain the modified $Al_2O_3$. The modified $Al_2O_3$ was dried at 120° C. for 12 hours and calcined at 540° C. for 6 hours to obtain calcined modified $Al_2O_3$.

In another flask 4.177 mL of 18.134 mg/mL $H_2PtCl_6 \cdot (H_2O)_6$ and 0.658 mL of 115.08 mL/g $SnCl_2$ aqueous solutions were taken in 197.96 mL of water to obtain a third mixture. 7.2 mL of concentrated HCl was added to the third mixture to obtain dark red colored fourth mixture. 30 g of calcined modified $Al_2O_3$ was added to the fourth mixture to obtain a slurry. The slurry containing alumina support was stirred for 12 hours at room temperature. The water was removed under reduced pressure on rotary evaporator. The resultant residue was dried at 120° C. for 12 hours and calcined at 540° C. for 6 hours to obtain the reforming catalyst.

Experiment 2: Reforming Reaction

The performance evaluation of the commercial catalyst (named as reference catalyst), bimetallic catalyst prepared on alumina support (support used as such without any modification i.e. Pt—Sn/$Al_2O_3$, named as catalyst-1) and the reforming catalyst with modified support (named as catalyst-2) prepared in accordance with the present disclosure was compared.

The reaction was carried out using a fixed bed reactor under the reaction conditions of $H_2$ pressure of 7.3 kg/cm$^2$, $H_2$/HC mole ratio 4, LHSV 1.95 h$^{-1}$, and a reaction temperature of 521° C., using naphtha feed. The fixed bed reactor was flushed with nitrogen and made leak-proof before initiating the reaction. The catalyst was activated at 460° C. for 6 hours and at 510° C. for 2 hours. After activating the catalyst the naphtha feed was introduced in the reactor at 440° C.

Figure 1:
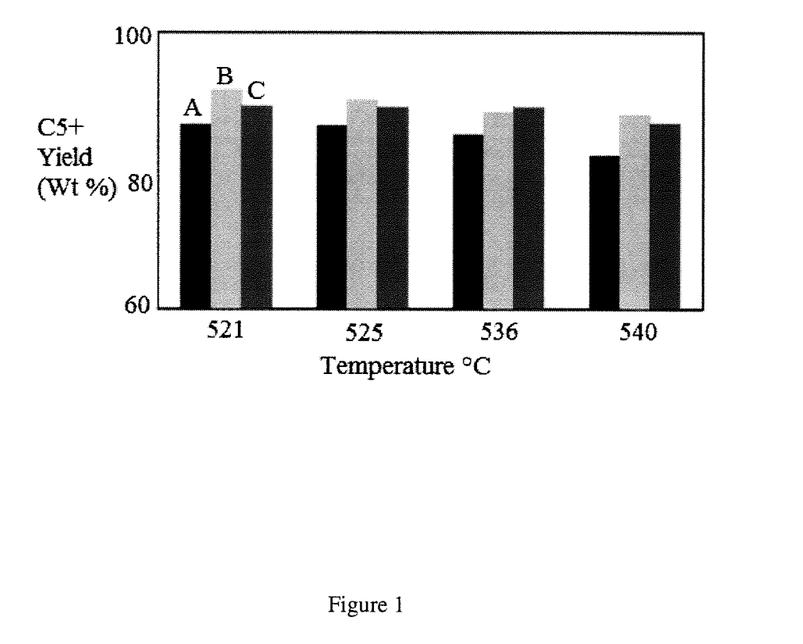
FIG. 1 illustrates the $C_5+$ reformates yield vs reaction temperature for reference catalyst, catalyst-1, and catalyst-2; wherein 'A' represents reference catalyst, 'B' represents catalyst-1 and 'C' represents catalyst-2.
Figure 2:
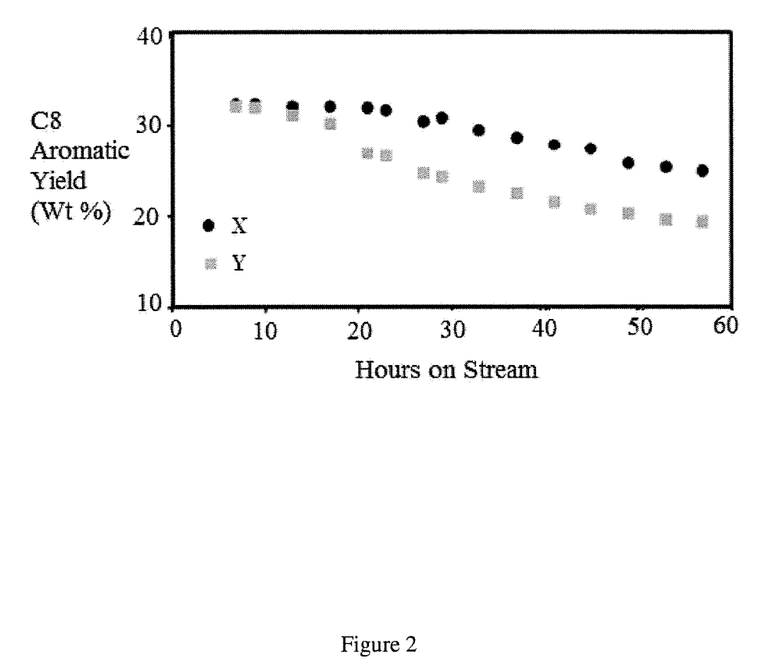
FIG. 2 illustrates the $C_8$ aromatic yield vs hours on stream (HOS) for reference catalyst and catalyst-1; wherein 'X' represents reference catalyst and 'Y' represents catalyst-1.
Figure 3:
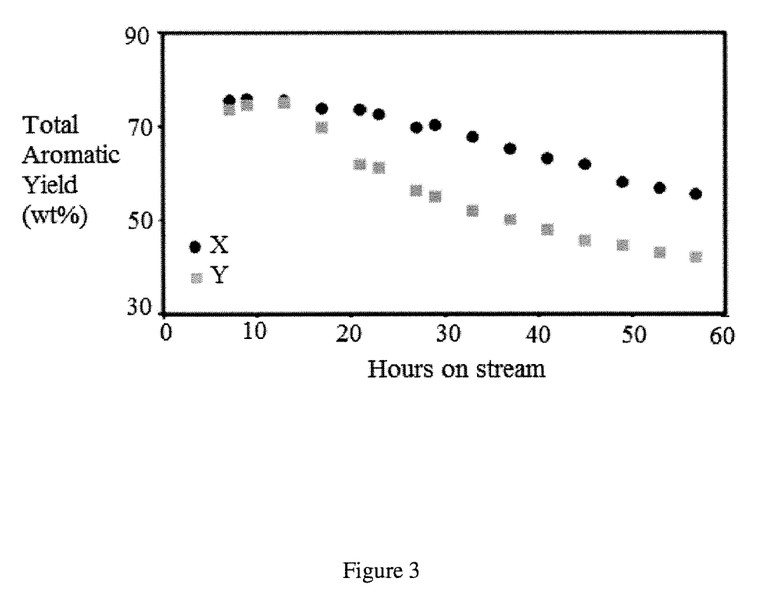
FIG. 3 illustrates the total aromatic yield vs hours on stream (HOS) for reference catalyst and catalyst-1; wherein 'X' represents reference catalyst and 'Y' represents catalyst-1.

The performance of catalyst-1 was compared with the performance of the reference catalyst. The $C_5+$ reformate yield, $C_8$ aromatic yield vs Hours on Stream (HOS) and the total aromatic yield vs hours on stream (HOS) are depicted in FIGS. 1, 2 and 3 respectively. The $C_5+$ reformate yield by catalyst-1 is higher by 4-6% as compared to that of reference catalyst in the temperature range 521 to 540° C. However, there was a gradual decline in the $C_8$ aromatics and total aromatics as the hours on stream progress in catalyst-1 due to faster deactivation. As the run progressed, at HOS 58, catalyst-1 showed lower $C_8$ aromatic yield (by 5 wt %) and lower total aromatic yield (by 15 wt %) as compared to that of the reference catalyst. The overall performance in terms of catalyst activity and stability of catalyst-1 deteriorated as compared to that of the reference catalyst.

Figure 4:
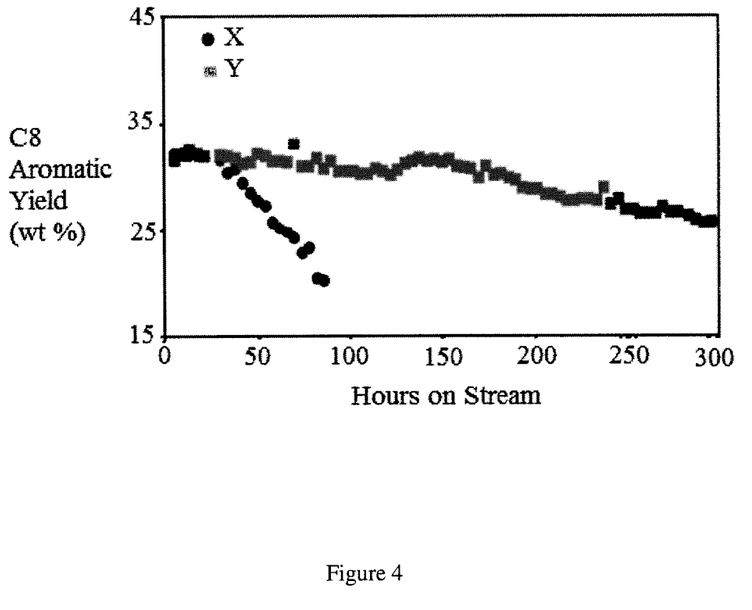
FIG. 4 illustrates the $C_8$ aromatic yield vs hours on stream (HOS) for reference catalyst and catalyst-2; wherein 'X' represents reference catalyst and 'Y' represents catalyst-2.
Figure 5:
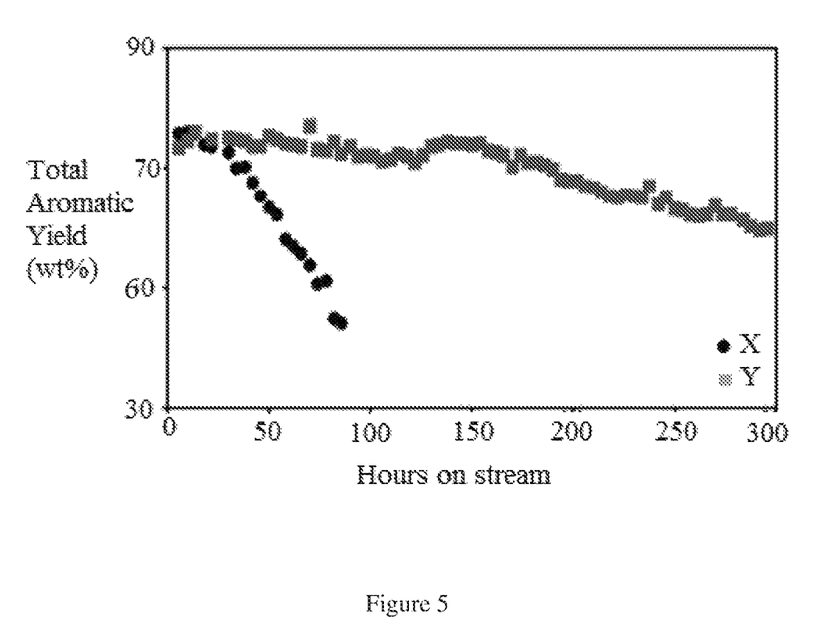
FIG. 5 illustrates the total aromatic yield vs hours on stream (HOS) for reference catalyst and catalyst-2; wherein 'X' represents reference catalyst and 'Y' represents catalyst-2.

The performance of the reforming catalyst prepared in accordance with the present disclosure (named as catalyst-2) was compared with the reference catalyst and the results are depicted in FIGS. 4 and 5. The $C_5$ reformate yield at the temperature range of 521 to 540° C. was higher by 3-4% in case of catalyst-2 as compared to that of reference catalyst as depicted in FIG. 1. At Start of Run (SOR) condition, the $C_8$ aromatics yield and total $C_8$ aromatics yield in reformate were comparable for the catalyst-2 and reference catalyst. At HOS 14, the $C_8$ aromatics yield and total $C_8$ aromatics yield were 32.61 and 75.77 wt %, respectively, with the catalyst-2, whereas at the same stage the $C_8$ aromatics yield and total $C_8$ aromatics yield were 32.2 wt % and 75.63 wt %, respectively, with the reference catalyst.

As the run progresses beyond HOS 35, the performance of the reference catalyst declines due to catalyst deactivation and as a result the $C_8$ aromatic yield and total aromatic yield declined sharply as a function of HOS. At HOS 73, the $C_8$ aromatics yield and total $C_8$ aromatics yield was found to be 20.44 wt % and 44.96 wt %, respectively, with reference catalyst. However, even at HOS 295, the aromatics yield and total $C_8$ aromatics yield were 29.88 and 70.22 wt. %, respectively, with catalyst-2. Thus, catalyst-2 exhibited better stability with lower coke deposition than the reference catalyst, as illustrated in table 1.

TABLE 1

| Coke content of Spent samples using TGA-DTA | |
|---|---|
| Sample | % Coke per Kg of feed processed |
| Reference Catalyst | 6.1 |
| Catalyst-1 | 5.2 |
| Catalyst-2 | 0.67 |

The reforming catalyst composition in accordance with the present disclosure comprises a Group VB metal oxide sheet coated over the alumina support and impregnated with Group VIII metal as active agent and Group IVA metal as promoter.

The catalyst so prepared has improved catalytic performance with modification of acidic sites for cracking reaction and in turn modifying the metal function through metal support interaction and optimizes the acidity and enhances the catalytic performance. The reforming catalyst composition in accordance with the present disclosure offers improved catalyst activity, selectivity and at least 3 fold stability as compared to commercially available catalyst due to decreased cracking.

Technical Advances

The present disclosure relates to the reforming catalyst and the process for preparation thereof. The reforming catalyst has several technical advancements such as:

The present disclosure provides a reforming catalyst composition having improved catalytic activity and stability.

The present disclosure also provides a stable reforming catalyst composition with improved C8 and total aromatics yield.

The present disclosure also provides a method for the preparation of the reforming catalyst composition having an alumina support.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A reforming catalyst composition comprising:
   a. a spherical gamma $Al_2O_3$ support;
   wherein the spherical gamma $Al_2O_3$ support is a chloride free spherical gamma $Al_2O_3$ support;
   b. at least one Group VB metal oxide sheet coated on to said $Al_2O_3$ support;
   wherein:
   the Group VB metal is at least one selected from a group consisting of niobium (Nb) and tantalum (Ta) having a concentration in the range of 0.01 to 0.5 wt % of the catalyst composition;
   the metal oxide sheet coating has a thickness in the range of 100 to 250 μm; and
   c. at least one active metal and at least one promoter metal impregnated on said $Al_2O_3$ coated support.

2. The catalyst composition as claimed in claim 1, wherein said active metal is at least one Group VIII metal selected from the group consisting of Platinum (Pt) and Palladium (Pd) having a concentration in the range of 0.01 to 0.5 wt % of the catalyst composition.

3. The catalyst composition as claimed in claim 1, wherein said promoter metal is at least one Group IVA, VIIB and VIIIB metal selected from a group consisting of Tin (Sn) and Germanium (Ge) having a concentration in the range of 0.01 to 0.5 wt % of the catalyst composition.

4. A method for preparing the reforming catalyst composition as claimed in claimed 1, said process comprising the following steps:

a. dissolving at least one Group VB metal chloride in a predetermined amount of alcohol and aqueous ammonia in a flask to obtain a Group VB metal oxide gel;
   b. adding a predetermined amount of $Al_2O_3$ to said flask containing the Group VB metal oxide gel to obtain a first mixture;
   c. hydrothermally treating said first mixture at a predetermined temperature for a predetermined time period to obtain a second mixture comprising modified $Al_2O_3$ coated with Group VB metal oxide sheet;
   d. filtering said second mixture comprising modified $Al_2O_3$ to obtain a first residue and a first filtrate;
   e. drying said first residue at a temperature in the range of 100° C. to 150° C. for a time period in the range of 10 hours to 15 hours and calcining said first residue at a temperature in the range of 530° C. to 560° C. for a time period in the range of 4 to 8 hours to obtain a calcined modified $Al_2O_3$;
   f. dissolving a predetermined amount of at least one active metal salt selected from Group VIII metal salt and a predetermined amount of at least one promoter metal salt selected from Group IVA in water, in a second flask to obtain a third mixture;
   g. adding a predetermined amount of concentrated HCl to said third mixture to obtain a dark red colored fourth mixture;
   h. introducing a predetermined amount of calcined modified $Al_2O_3$ to said fourth mixture and stirring it for a time period in the range of 8 to 16 hours at a temperature in the range of 25° C. to 35° C., followed by removing water under reduced pressure to obtain a second residue; and
   i. drying and calcining said second residue to obtain the reforming catalyst composition.

5. The method as claimed in claim 4, wherein said predetermined temperature is in the range of 160° C. to 200° C. and said predetermined time period is in the range of 40 hours to 50 hours.

6. The method as claimed in claim 4, wherein the concentration of said active metal and promoter metal ranges from 0.01 to 0.5 wt % of the catalyst composition.

7. A process for naphtha reforming comprising the following steps:
   a. charging a fixed bed reactor with the reforming catalyst composition of claim 1 under inert atmosphere;
   b. introducing $H_2$ in said reactor till a pressure of 7.3 $kg/cm^2$ is achieved;
   c. heating the catalyst composition at a temperature in the range of 440 to 540° C.; and
   d. contacting naphtha having LHSV of 1.95 $hour^{-1}$ with said heated catalyst composition to obtain reformates of naphtha.

* * * * *